United States Patent
Hrnicek et al.

(10) Patent No.: US 9,148,995 B2
(45) Date of Patent: Oct. 6, 2015

(54) SPRAY BOOM HEIGHT CONTROL SYSTEM

(75) Inventors: Bryan N. Hrnicek, Webster City, IA (US); Alexander C. Castillo, Clarion, IA (US)

(73) Assignee: Hagie Manufacturing Company, Clarion, IA (US)

( * ) Notice: Subject to any disclaimer, the term of this patent is extended or adjusted under 35 U.S.C. 154(b) by 35 days.

(21) Appl. No.: 12/799,678

(22) Filed: Apr. 29, 2010

(65) Prior Publication Data

US 2011/0266365 A1  Nov. 3, 2011

(51) Int. Cl.
*A01C 23/00* (2006.01)
*A01B 79/00* (2006.01)
*A01M 7/00* (2006.01)

(52) U.S. Cl.
CPC .............. *A01C 23/008* (2013.01); *A01B 79/005* (2013.01); *A01M 7/0057* (2013.01)

(58) Field of Classification Search
CPC ...... A01C 23/00; A01C 23/008; A01B 79/00; A01B 79/005; A01M 7/0057; A01M 7/005; A01M 7/0053; A01M 7/0071; A01M 7/0075; A01M 7/0078; A01M 7/0089
USPC ......... 239/164, 165, 166, 723, 732, 733, 146, 239/159, 160, 161, 163, 167, 172, 176, 722
See application file for complete search history.

(56) References Cited

U.S. PATENT DOCUMENTS

| | | | | |
|---|---|---|---|---|
| 4,823,268 | A | * | 4/1989 | Giles et al. ...................... 701/50 |
| 5,348,226 | A | * | 9/1994 | Heiniger et al. ................... 239/1 |
| 5,585,626 | A | * | 12/1996 | Beck et al. ................. 250/222.1 |
| 5,794,852 | A | | 8/1998 | Wald et al. |
| 5,837,997 | A | * | 11/1998 | Beck et al. ............... 250/227.11 |
| 5,988,528 | A | | 11/1999 | Krohn et al. |
| 6,834,223 | B2 | * | 12/2004 | Strelioff et al. ................. 701/50 |
| 7,040,552 | B2 | | 5/2006 | McCrea et al. |
| 7,459,670 | B2 | * | 12/2008 | Lewin et al. .................. 250/221 |
| 2006/0118653 | A1 | | 6/2006 | Shivak |
| 2006/0118654 | A1 | | 6/2006 | Shivak |
| 2006/0144970 | A1 | | 7/2006 | Hagie |

OTHER PUBLICATIONS

Agrocom Vision, Local Positioning System (printed material re 2D plant camera, 3D camera, field operations for new camera technology).

* cited by examiner

*Primary Examiner* — Justin Jonaitis
(74) *Attorney, Agent, or Firm* — Brett J. Trout, P.C.

(57) ABSTRACT

A boom sprayer and method of adjusting a boom assembly. A camera is attached to the boom assembly and aimed forward of the boom sprayer. The camera collects information associated with the dimensions and location of oncoming structures, such as crops, hills, fences and the like, and relays the information to a controller. The controller uses various actuators to lift, tilt and/or pivot the boom assembly to position the boom assembly at a desired height when the boom assembly passes over the structures.

19 Claims, 10 Drawing Sheets

SPRAY BOOM HEIGHT CONTROL SYSTEM

TECHNICAL FIELD

The present invention relates to an agricultural spray boom height control system and, more particularly, to an agricultural spray boom height control system that identifies structures forward of the boom and raises or lowers the boom to avoid damage to crop and to apply a consistent spray pattern.

BACKGROUND

Spray booms are known in the art for use in association with various agricultural pursuits, including spraying plants with fertilizer, herbicide and the like. Such systems typically involve a generally horizontal boom provided with several sprayers. It is desirable to provide a spray boom with as many depending implements as possible, to treat as many rows as possible, during a single pass of the spray boom. As it is difficult to move very large spray booms on the highway, most spray booms are designed with a folding capability, which allows the spray boom to be folded for transport and extended for use. Spray booms can extend one hundred and twenty feet or more in width. While wider spray booms cover more land with each pass, they increase the likelihood the spray boom will encounter something unusual in its path. On uneven terrain, the spray boom may encounter hills or valleys that place the crop closer or farther away from the spray boom. The spray boom may also encounter areas of crops growing at a faster or slower rate, placing the tops of the crops closer or farther away from the boom. Fences, trees or other obstructions may also be in the path of the tips of the spray boom, posing a threat of damage to the spray boom if the boom is not moved.

Modern spray booms are provided with hydraulic lifts to move the spray booms up and down as desired, as well as with a tilt feature to tilt the booms relative to the support vehicles when the spray booms are operated on sloped surfaces. It is also known to provide the spray booms with hydraulic actuators that fold the sections of the spray booms for transport. While it would be possible to manually tilt and fold a spray boom to avoid obstacles, this system has two drawbacks. First, it would be difficult for an operator, especially with a very wide boom to maintain vigilant watch over the entire path of the spray boom. While the operator was busy adjusting the tilt or extension of one side of the boom, the other side of the boom would not be attended. Second, from the cab to the tips of the spray boom, it would be difficult to estimate the distance the spray boom should be moved up or down. While some adjustment may be better than no adjustment, some efficiency potential is still lost with manual adjustments.

Automatic spray boom adjustment systems are known in the art. Heiniger et al. U.S. Pat. No. 5,350,228 discloses a spray boom with automatic boom end height control. Streilioff et al U.S. Pat. No. 6,836,223 discloses an automatic system for tilting a spray boom. Such prior art patents use ultrasonic transducers or the like to bounce signals off the ground directly below the transducers. From the bounced signals, the systems are able to calculate the distance of the boom from the ground and tilt the boom accordingly to avoid contact with the ground.

One drawback associated with such prior art devices is that by the time the system receives the bounced signal, the transducer is already passed the point where the distance to the ground was measured. While such systems allow for the movement of the boom in relation to the changing terrain, the adjustments are being made relative to ground that has already been covered. While it is possible to extend the transducer slightly forward of the spray boom, extension more than a meter makes the transducer susceptible to undesirable vibration which can add error to the ground distance calculations. Even if the transducer is extended forward, unless the agricultural vehicle operates at a very slow speed, by the time the hydraulics associated with the spray booms readjust the orientation of the spray boom, the spray boom has already covered the area of ground measured by the transducer.

It would, therefore, be desirable to provide an articulated spray boom system which allows an agricultural vehicle with a spray boom to operate at a higher speed, measure an area in front of a spray boom and adjust the orientation of the spray boom before the spray boom reaches the measured area. The prior art difficulties described hereinabove are substantially eliminated by the present invention.

SUMMARY

This Summary is provided to introduce concepts in a simplified form. The Detailed Description that follows describes these concepts further. This Summary is not designed to detail key or essential features of the claimed subject matter. This Summary is not intended to be used as an aid in determining the scope or meaning of the claimed subject matter.

A boom sprayer and method are provided. A signal system is coupled to a boom assembly mounted on an agricultural support vehicle. A boom lift assembly moves the boom. The signal system produces a signal representative of a structure at least two meters ahead of the boom lift assembly. A controller actuates the boom lift assembly to lift the boom in response to receipt of the signal.

In one example, the signal system is a light emitting diode, which directs light forward of the boom assembly. The light reflects off a structure, such as an agricultural plant, and returns to the boom sprayer. An image sensor receives the reflected light and calculates the height and distance of the plant relative to the boom assembly. The image sensor relays the height and distance information to the boom lift assembly which lifts, tilts and/or pivots the boom assembly as desired to position the boom assembly at the desired height when passing over the plant.

BRIEF DESCRIPTION OF THE DRAWINGS

The present invention will now be described, by way of example, with reference to the accompanying drawings, in which:

FIG. 6 illustrates a top elevation of the boom sprayer of FIG. 1 spraying crops in a field;

DETAILED DESCRIPTION

Figure 1:
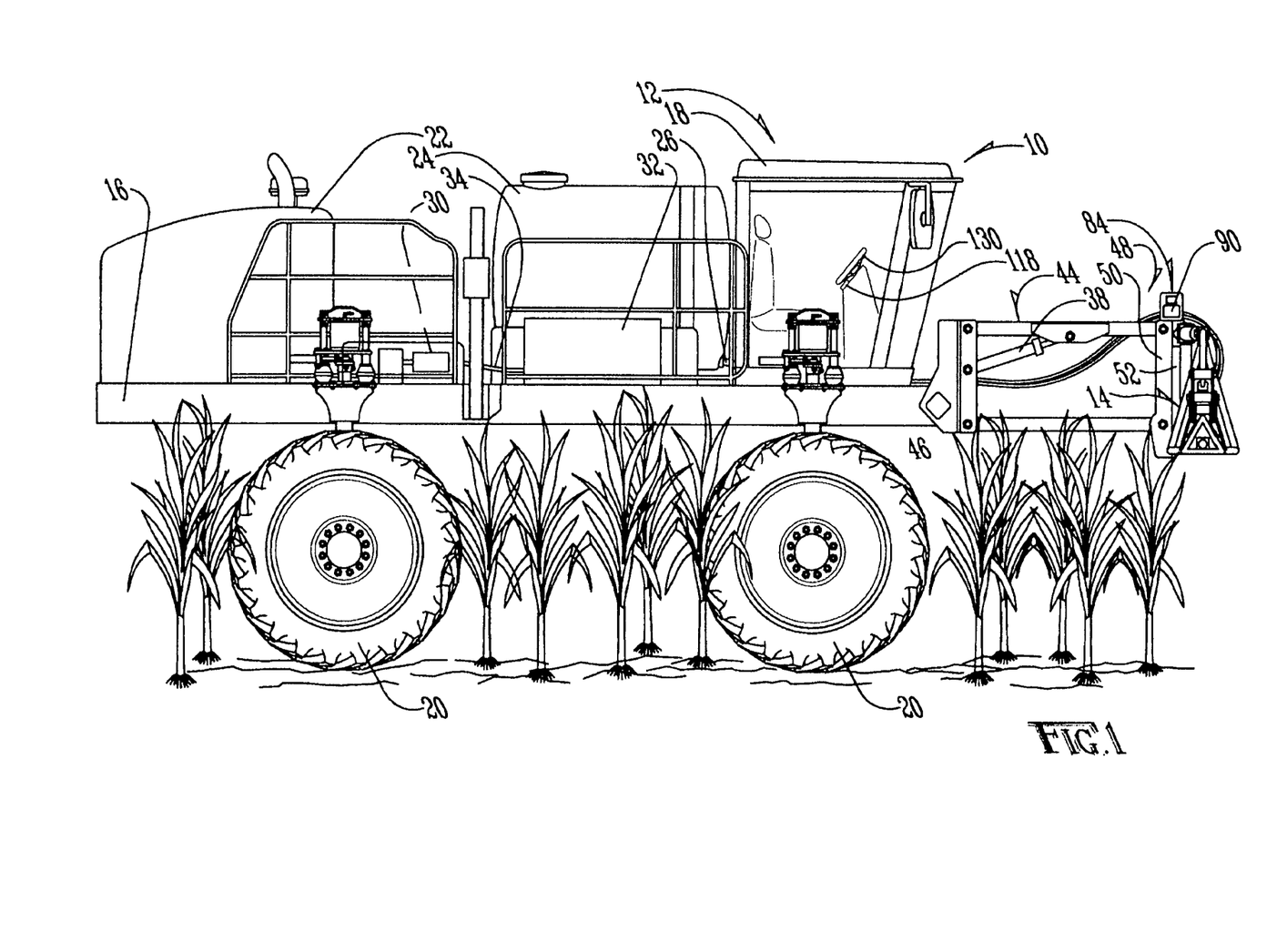
FIG. 1 illustrates a side elevation of the boom sprayer of the present invention.

With reference to the drawings, a boom sprayer according to the present invention is shown generally as (10) in FIG. 1. The boom sprayer (10) is an agricultural support vehicle (12) coupled to a boom assembly (14). The boom assembly may be of any desired width, but is preferably at least eighteen meters wide and more preferably more than twenty-seven meters wide.

Figure 2:
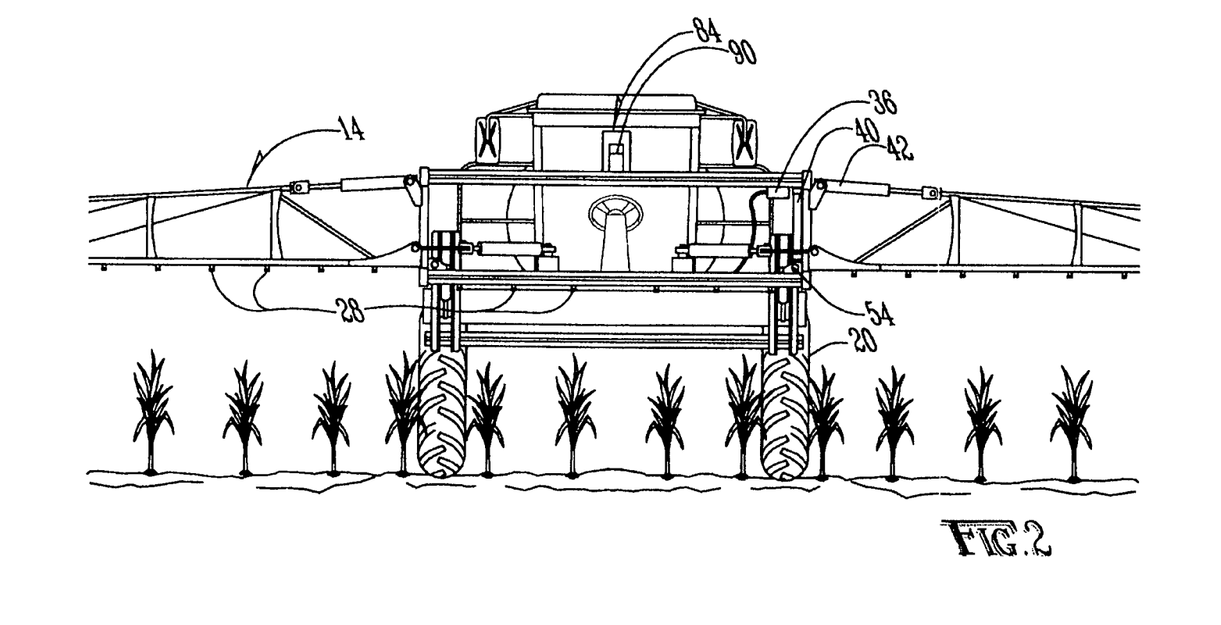
FIG. 2 illustrates a front elevation of the boom sprayer of FIG. 1.

While the vehicle (12) may be of any type known in the art, in the preferred embodiment the vehicle (12) is an STS12 sprayer, manufactured by Hagie Manufacturing Company of Clarion, Iowa. The vehicle includes a frame (16), coupled to a driver's cab (18) wheels (20) and a diesel engine (22). The engine (22) preferably produces more than one hundred horsepower, more preferably more than two hundred horsepower and most preferably about two hundred and eighty five horsepower. The vehicle (12) also includes a fluid container (24) preferably having a capacity of greater than one thousand liters, more preferably having a capacity greater than two thousand five hundred liters and most preferably about four thousand five hundred liters. A plurality of fluid lines (26) is coupled between the fluid container (24) and spray nozzles (28) provided on the boom assembly (14). (FIGS. 1-2).

The vehicle (12) is preferably provided with a hydrostatic drive pump (30), coupled to a hydraulic fluid tank (32) and a plurality of hydraulic lines (34). The hydraulic lines (34) are coupled to a hydraulic control valve manifold (36) that, in turn, is coupled to the boom assembly (14). The hydraulic control valve manifold (36) feeds to a plurality of hydraulic cylinder assemblies (38), (40) and (42) configured to lift, tilt and pivot the boom assembly (14). The first hydraulic cylinder assembly (38) is coupled to a four-bar parallel linkage (44) that couples the boom assembly (14) to the vehicle (12). A brace member (46) is welded to the vehicle frame (16) and a tilt assembly (48) is coupled to the boom assembly (14). The four-bar parallel linkage (44) maintains the brace member (46) parallel to the tilt assembly (48) as the boom assembly (14) is raised and lowered.

The tilt assembly (48) has an outer race frame (50) coupled to an inner race frame (52) The second hydraulic cylinder assembly (40) is coupled between an outer race frame (50) and an inner race frame (52). The races (50) and (52) are coupled to one another by a plurality of rollers (54), or by a low friction material such as grease, Teflon (not shown), or by any means known in the art. While the outer race frame (50) is coupled to the four-bar parallel linkage (44), the inner race frame (52) is coupled to the boom assembly (14) to allow the boom assembly (14) to tilt relative to the vehicle (12).

The third hydraulic cylinder assembly (42) pivots beam sections (56), (58), (60), (62), (64), (66), (68) and (70) of the boom assembly (14). The beam sections (56), (58), (60), (62), (64), (66) and (70) are all hingeably coupled to one another in a manner such as that known in the art. The third hydraulic cylinder assembly (42) includes a plurality of hydraulic cylinders (72), (74), (76), (78), (80) and (82). The two main cylinders (72) and (74) are coupled between the center beam section (56) and the two main beam sections (58) and (60) to draw the two main beam sections (58) and (60) rearward for transport and forward for spraying. The two middle hydraulic cylinders (76) and (78) are coupled between the main beam sections (58) and (60) and middle beam sections (62) and (64) to pivot the middle beam sections (62) and (64) outward. The two end hydraulic cylinders (80) and (82) are coupled between the middle beam sections (62) and (64) and end beam sections (66) and (68) to pivot the end beam sections (66) and (68) outward.

Figure 3:
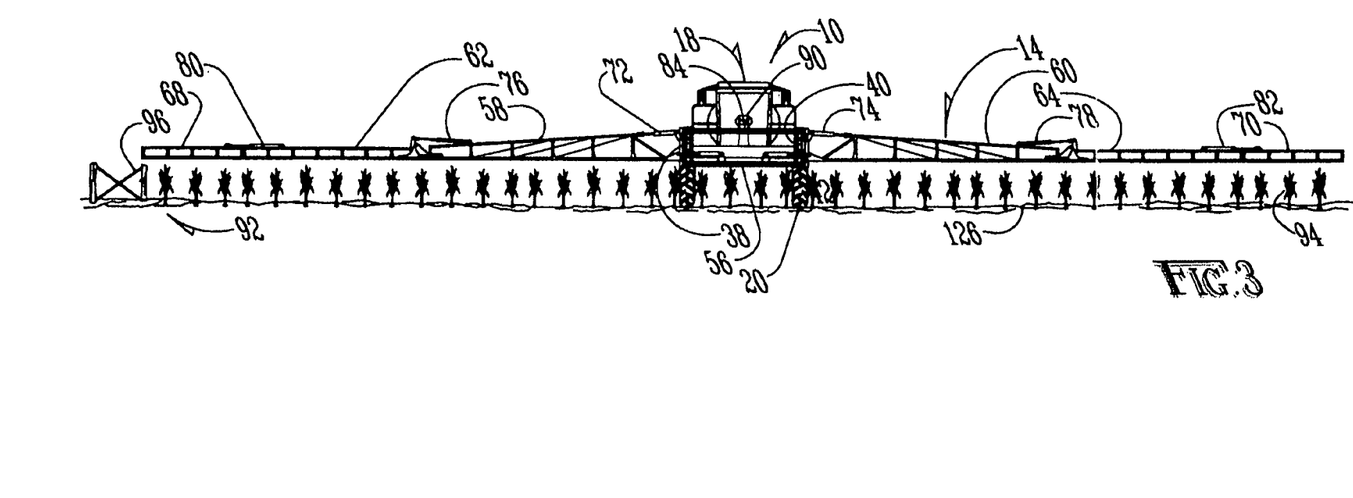
FIG. 3 illustrates a front elevation of the boom sprayer of FIG. 1 spraying crops in a field.
Figure 4:
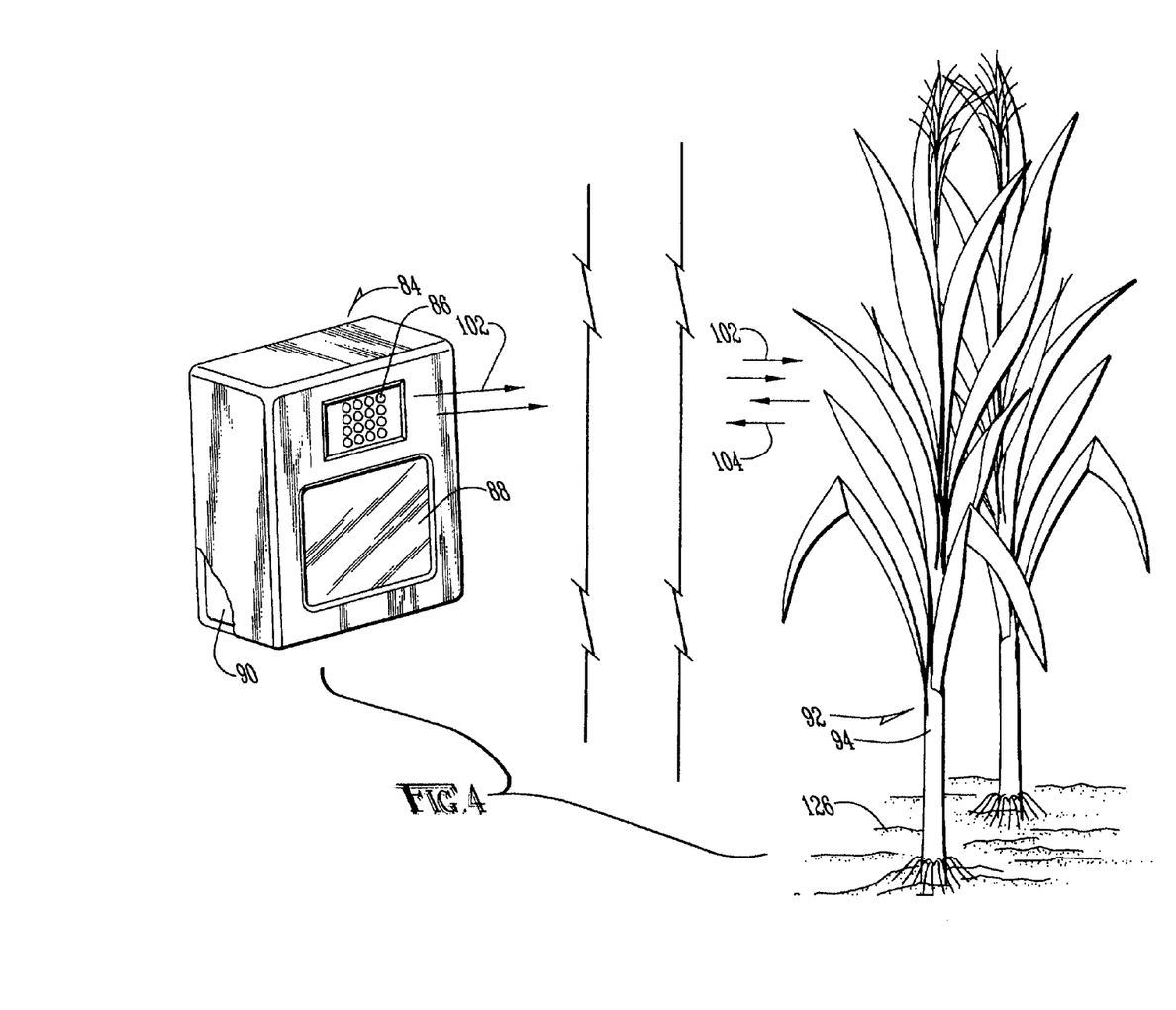
FIG. 4 illustrates a perspective view of the camera reflecting light off of crops.

Mounted to the top of the outer race frame (50) is a signal system (84). As shown in FIGS. 3-4, the signal system (84) includes an illumination source and an image sensor. The illumination source is a plurality of light emitting diodes (LED) (86). The image sensor is a light sensor (88), preferably a standard complementary metal oxide semiconductor (CMOS) technology sensor chip, but may be any type of sensor. The sensor (88) is provided with a 64×48 pixel array and a field of view of between 20 and 60 degrees vertical, more preferably between 30 and 50 degrees vertical and most preferably about 40 degrees vertical. The sensor (88) is provided with a field of view of between 10 and 50 degrees horizontal, more preferably between 20 and 40 degrees horizontal and most preferably about 30 degrees horizontal.

Figure 5:
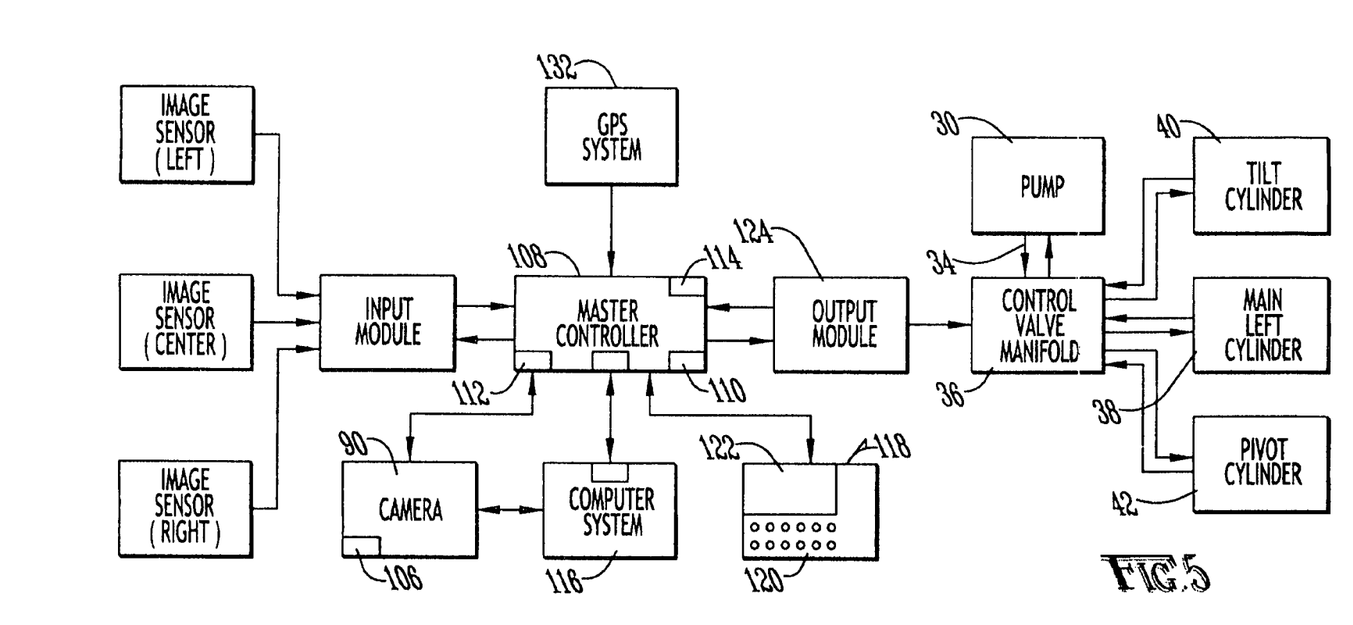
FIG. 5 illustrates a block diagram of the controller connections.

The LEDs (86) and light sensor (88) are components of a PMD O3D200 3D video range camera (90) manufactured by PMDTechnologies GmbH, Am Eichenhang 50, 57076 Siegen, Germany. The camera (90) uses time-of-flight (TOF) methodology to identify the location of a structure (92), such as crops (94), fences (96), hills (98), valleys (100) or any other type of structure, relative to the camera (90). The LEDs (86) use continuous wave modulation of the rectangular (squared) signal of light (102) produced. The camera (90) is provided with a processing unit (106). (FIGS. 4-5).

The phase delay between the light (102) produced by the LEDs (86) and the light (104) received by the sensor (88) is used by the processing unit (106) to determine the distance between the sensor (88) and the structure (92) using known TOF methodologies. Although the signal system (84) uses LEDs (86) in the preferred embodiment, the signal system (84) may use a laser or any other suitable illumination source and may scan each pixel separately, rather than process the input from all pixels simultaneously. The light (102) may be modulated by frequency or amplitude. Measurement of the time between the light (102) leaving the illumination source and the light (104) being received by the light sensor (88) may also be used. The TOF methodology is preferably light modulation, but any suitable TOF methodology may be used.

The processing unit (106) is programmed to calculate TOF for all pixels of the sensor (88) in parallel. It is desirable to modulate the frequency to obtain a detection range in excess of two meters, more preferably three meters and most preferably in excess of five meters. The preferred modulation frequency of 20 MHz provides a range of approximately seven and one half meters. The processing unit (106) may be wired or connected wirelessly to a master controller (108). The master controller (108) is provided with its own processing unit (110), a hard-wire connection port (112), such as a USB port and a wireless card (114), to allow the master controller (108) to be configured and have its data analyzed by an external computer system (116) that may also be connected to the camera (90). The master controller (108) is coupled to an interface (118) that includes a keyboard (120) and a display (122) to allow a user to receive information from, and input instructions to, the master controller (108). The master controller (108) is coupled to an output module (124) that sends signals to the hydraulic control valve manifold (36). The hydraulic control valve manifold (36) directs hydraulic fluid from the hydraulic pump (30), to the hydraulic cylinder assemblies (38), (40) and (42).

The external computer system (116) may be used to program the camera (90) to adjust the modulation of the LEDs (86), the sensitivity of the sensor (88) or the filtering of background noise received by the sensor (88). The external computer system (116) may also be used to program the master controller (108) to increase or decrease the reaction times of the hydraulic cylinder assemblies (38), (40) and (42), or to prioritize the order and degree to which the hydraulic cylinder assemblies (38), (40) and (42) actuate relative to one another.

Once the camera (90) and the master controller (108) have been programmed as desired, an operator positions the boom sprayer (10) in a field (126) with crops (94). (FIG. 3). The operator sets the desired height of the boom assembly, actuates the camera (90) and the master controller (108) and navigates the boom sprayer (10) along the rows (128) of crops (94). (FIGS. 1-6). As shown in FIGS. 4-5, when the boom sprayer (10) encounters a structure (92), the LEDs (86) illuminate the structure (92) with light (102), which reflects a portion of the light (104) back to the sensor (88). The processing unit (106) receives and filters information from the sensor (88) to determine the location of the structure (92) relative to the sensor (88). The processing unit (106) sends this information to the master controller (108) which, based upon predetermined parameters previously programmed into the master controller (108) through the computer (96), actuates one or more of the hydraulic cylinder assemblies (36), (38) and (40).

Figure 7:
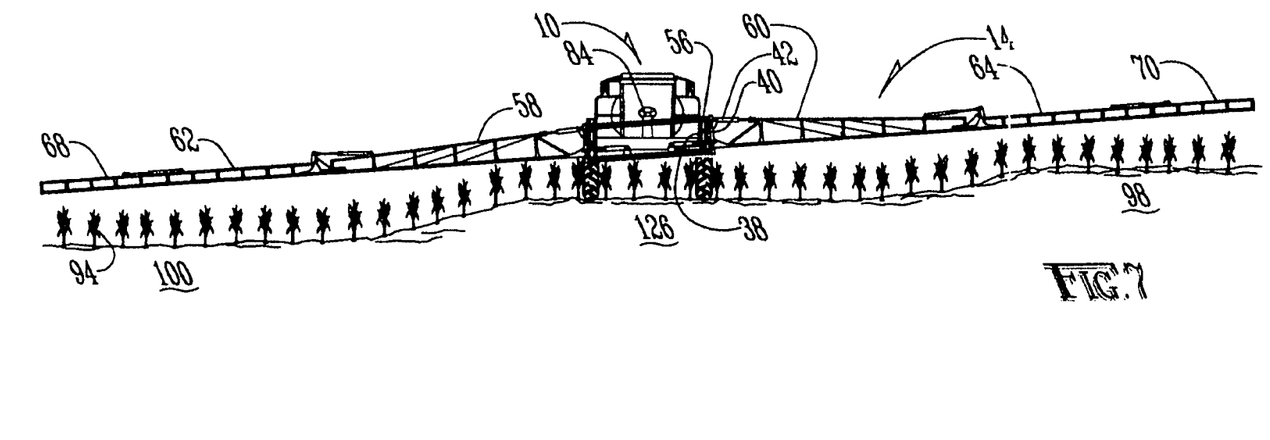
FIG. 7 illustrates a front elevation of the boom sprayer of FIG. 1, shown with the boom tilted and pivoted.

As shown in FIG. 7, as the boom sprayer (10) approaches a hill (98), the camera (90) identifies the change, based upon the position of the crops (94). Alternatively, the camera (90) may be configured to identify the actual change in the slope of the field (126). Upon receipt of the slope change information from the processing unit (106), the master controller (108) actuates the hydraulic cylinder assembly (38) to tilt the boom assembly (14). The master controller (108) is also coupled to a speedometer (110) to determine the rate at which to actuate the hydraulic cylinder assembly (38) to tilt the boom assembly (14) so that the boom assembly (14) is in the desired orientation by the time the boom assembly (14) reaches the hill (106). Alternatively, the master controller (108) may calculate the rate at which to actuate the hydraulic cylinder assembly (38) based upon incoming input from the processing unit (106). As the boom sprayer (10) approaches the end of the hill (106), the camera (90) identifies the change in slope, and the master controller (108) actuates the hydraulic cylinder assembly (40) to return the tilt of the boom assembly (14) to its default orientation.

Figure 8:
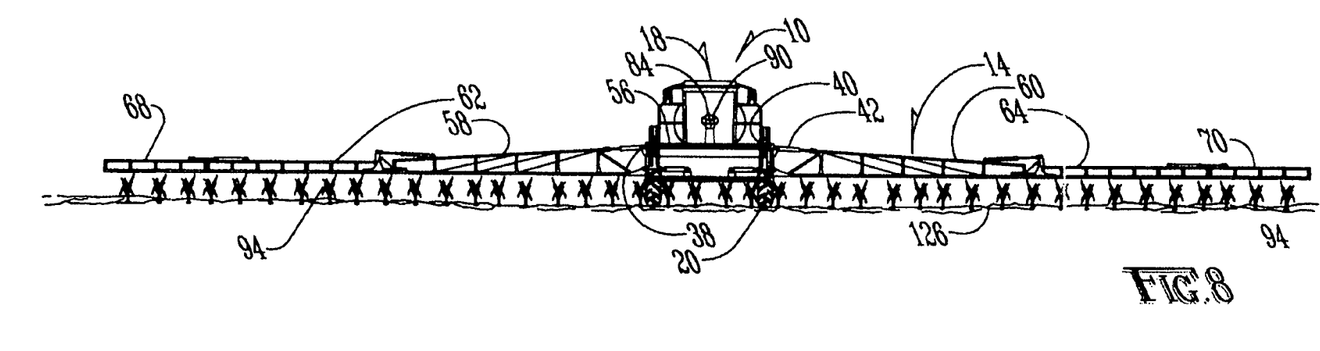
FIG. 8 illustrates a front elevation of the boom sprayer of FIG. 1, shown with the boom lowered.

As shown in FIG. 8, as the boom sprayer (10) approaches an area where the crops (94) are lower, due to flooding or the like, the camera (90) identifies the change, based upon the position of the crops (94). Upon receipt of the crop height change information from the processing unit (106), the master controller (108) moves the boom assembly (14). If the crop height is uniformly lower across the entire length of the boom assembly (14), the master controller (108) actuates the hydraulic cylinder assembly (38) to lower the entire boom assembly (14). If the crop height is lower across only one side of the boom assembly (14), or across only part of the boom assembly (14), the master controller (108) actuates the hydraulic cylinder assembly (42) to lower one or more of the beam sections (58), (60), (62), (64), (68) or (70) of the boom assembly (14). As shown in FIG. 8, the master controller (108) may actuate a combination of all of the hydraulic cylinder assemblies (38), (40) and (42) to position the boom assembly (14) as desired to accommodate the terrain and any associated structures (92).

Figure 9:
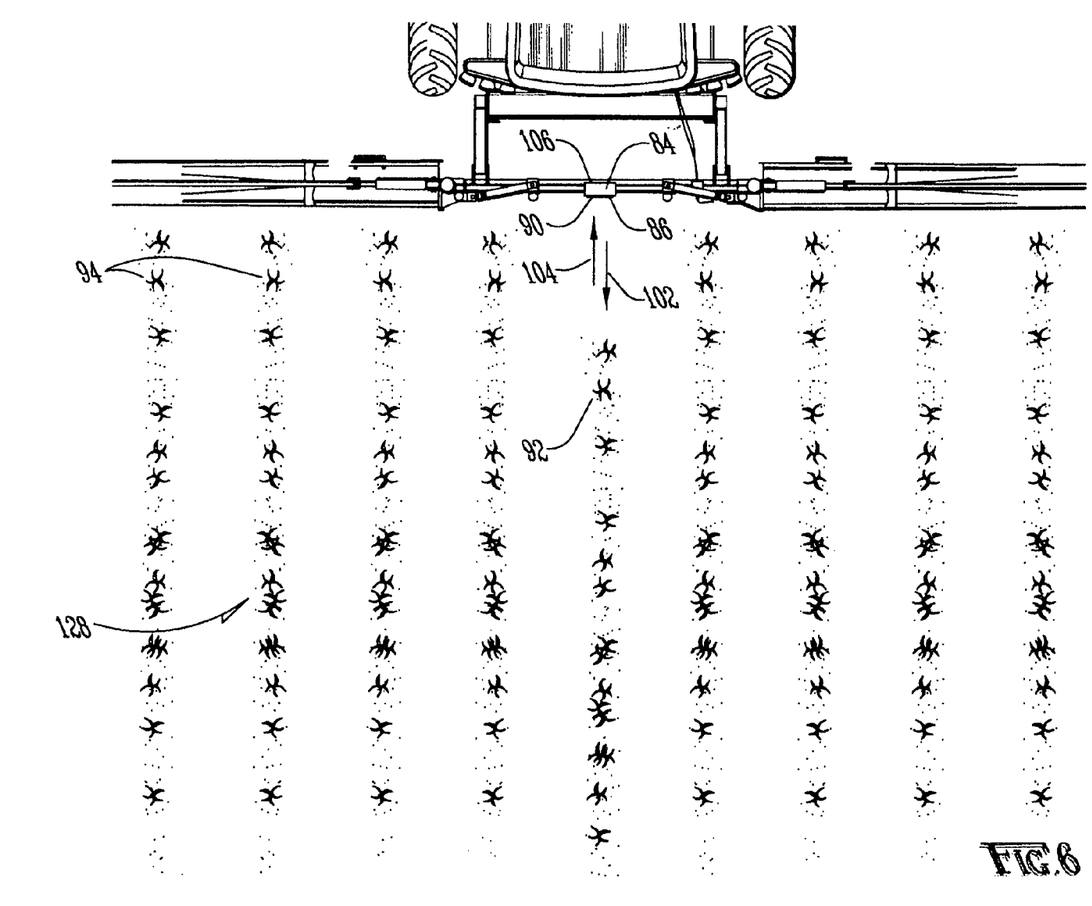
FIG. 9 illustrates a front elevation of the boom sprayer of FIG. 1, shown with the boom tilted, pivoted and lowered.
Figure 10:
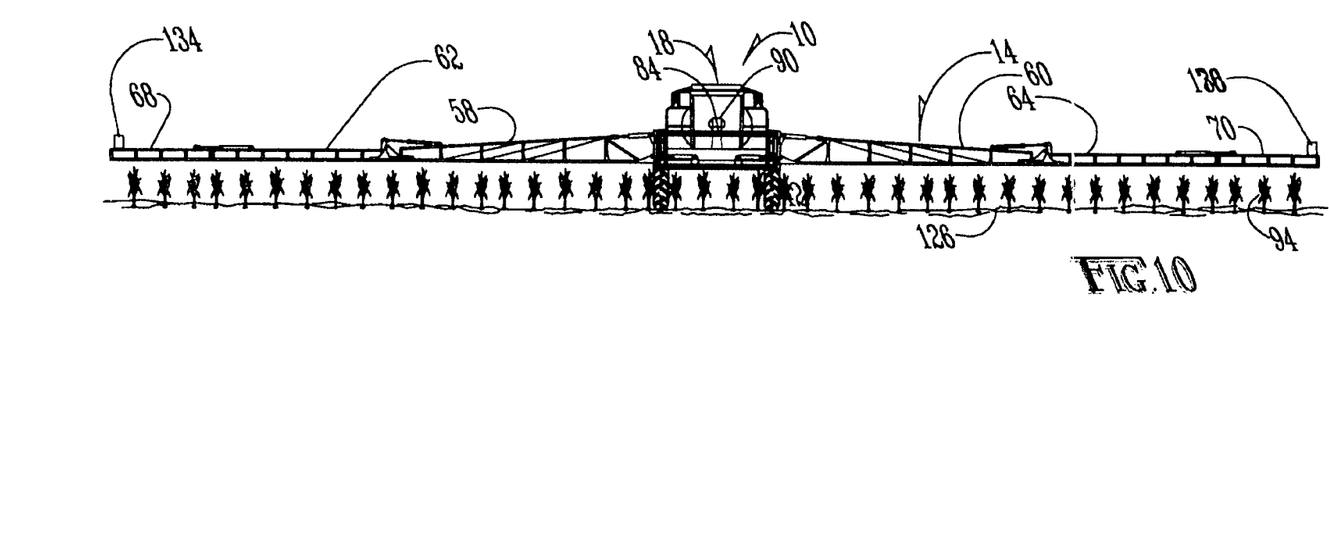
FIG. 10 illustrates a top elevation of an alternative embodiment of the boom sprayer shown with multiple cameras.

As shown in FIG. 9, as the boom sprayer (10) approaches a structure (92), such as a fence (96) or the like, the camera (90) locates the fence (96), and the processing unit (106) forwards the location information to the master controller (108), which moves the boom assembly (14) to avoid the fence (96). The master controller (108) may also be coupled to the steering system (130) of the boom sprayer (10) to automatically steer the boom sprayer (10) along a predetermined path using the rows (128) of crops (94), as identified by the camera (90) as guide and location points. The master controller (108) may also be coupled to a global positioning satellite (GPS) system (132) and the engine (22) to fully automate the driving of the boom sprayer (10). The computer (96) may also be used to program the master controller (108) with a predetermined path using input from the camera (90) and/or GPS system (114) to control the steering system (112) and engine (22). As shown in FIG. 10, multiple cameras (134) and (136) may be provided on the boom assembly (14) to more accurately represent the location of structures (92). In this embodiment, the end cameras are positioned approximately one meter from the end of the boom assembly (14) and coupled to the master controller (108).

Although the invention has been described with respect to a preferred embodiment thereof, it is to be understood that it is not to be so limited, since changes and modifications can be made therein which are within the full, intended scope of this invention as defined by the appended claims. For example, if the crops (94) are low or non-existent, the camera (90) may be programmed to identify the field (126) itself and the master controller (108) programmed to adjust the boom assembly (14) relative to the field (126), rather than the crops (94).

What is claimed is:

1. A boom sprayer comprising:
   (a) an agricultural support vehicle;
   (b) a boom assembly mounted to the vehicle;
   (c) a signal system configured to receive a signal from a structure located at least two meters forward of the boom wherein the signal has a field of view of at least ten degrees;
   (d) wherein the signal system is provided with a sensor having a field of view of at least ten degrees
   (e) a boom lift assembly configured to move at least a portion of the boom; and
   (f) a controller coupled to the boom lift assembly, the controller configured to actuate the boom lift assembly to move at least a portion of the boom from a first height to a second height in response to receipt of the signal.

2. The boom sprayer of claim 1, the boom is rotatably coupled to the vehicle.

3. The boom sprayer of claim 1, the boom comprising:
   (a) a first boom section; and
   (b) a second boom section coupled to and pivotable in relation to the first boom section.

4. The boom sprayer of claim 3, further comprising a third boom section coupled to and pivotable in relation to the second section.

5. The boom sprayer of claim 1, further comprising an illumination source configured to bounce illumination from the first structure to the first signal system.

6. The boom sprayer of claim 5, the first signal system is configured to produce the first signal in response to receiving illumination from the illumination source reflected from the first structure.

7. The boom sprayer of claim 5, wherein the first signal system has a field of view less than forty-five degrees horizontal and less than forty-five degrees vertical.

8. The boom sprayer of claim 5, wherein the illumination source is a light emitting diode.

9. The boom sprayer of claim 8, a processing unit coupled to the first signal system and the second signal system, the processing unit configured to produce a three dimensional representation of the structure.

10. A boom sprayer comprising:
(a) an agricultural support vehicle;
(b) a boom assembly mounted to the vehicle;
(c) a boom lift assembly configured to move at least a portion of the boom;
(d) an illumination source; having a field of view of at least ten degrees;
(e) an image sensor configured to receive illumination from the illumination source reflected from a structure, wherein the image sensor is directed forward of the boom along a direction of travel associated with the agricultural support vehicle wherein the sensor has a field of view of at least ten degrees;
(f) a processing unit coupled to the image sensor, the processing unit configured to produce a signal representative of at least two coordinates associated with the structure; and
(g) a controller coupled to the boom lift assembly and the processing unit, the controller configured to actuate the boom lift assembly to actuate the boom lift assembly to move at least a portion of the boom from a first height to a second height in response to receipt of the signal from the processing unit.

11. The boom sprayer of claim 10, the illumination source is a light emitting diode.

12. The boom sprayer of claim 11, the boom is rotatably coupled to the vehicle.

13. The boom sprayer of claim 12, the boom is extensible.

14. The boom sprayer of claim 10, the boom comprising:
(a) a first boom section; and
(b) a second boom section coupled to and pivotable in relation to the first boom section.

15. A method of moving a boom in response to a structure comprising the steps of:
(a) providing a boom assembly on an agricultural support vehicle;
(b) illuminating a structure located in front of the boom with a signal having a field view of at least ten degrees
(c) receiving a reflection of illumination from the structure using a sensor having a field or view of at least ten degrees; and
(d) moving the boom to provide a predetermined distance between the boom and the structure when the boom passes the structure.

16. The method of moving a boom of claim 15, further comprising receiving the reflection of the illumination from the structure when the structure is located at least two meters forward of the boom.

17. The method of moving a boom of claim 15, further comprising projecting the illumination from a light emitting diode.

18. The method of moving a boom of claim 15, further comprising tilting a first section of the boom relative to a second section of the boom to provide the predetermined distance between the boom and the structure when the boom passes the structure.

19. The method of moving a boom of claim 15, further comprising the steps of:
(a) providing an illumination source;
(b) projecting supplemental illumination forward of the vehicle from the illumination source;
(c) providing a sensor;
(d) receiving a reflection of the illumination from the structure with the sensor;
(e) calculating time of flight of the illumination from the illumination source to the structure and to the sensor; and
(f) moving the boom in response to receipt of values associated with the time of flight.

* * * * *

UNITED STATES PATENT AND TRADEMARK OFFICE
CERTIFICATE OF CORRECTION

| | | |
|---|---|---|
| PATENT NO. | : 9,148,995 B2 | Page 1 of 1 |
| APPLICATION NO. | : 12/799678 | |
| DATED | : October 6, 2015 | |
| INVENTOR(S) | : Hrnicek | |

It is certified that error appears in the above-identified patent and that said Letters Patent is hereby corrected as shown below:

In Claim 15, line 6, claim 7, delete "or" and insert therefor --of--.

Signed and Sealed this
Twenty-second Day of March, 2016

Michelle K. Lee
*Director of the United States Patent and Trademark Office*